W. R. DAGGETT.
TROLLEY GUARD.
APPLICATION FILED AUG. 10, 1910.
1,041,437.
Patented Oct. 15, 1912.
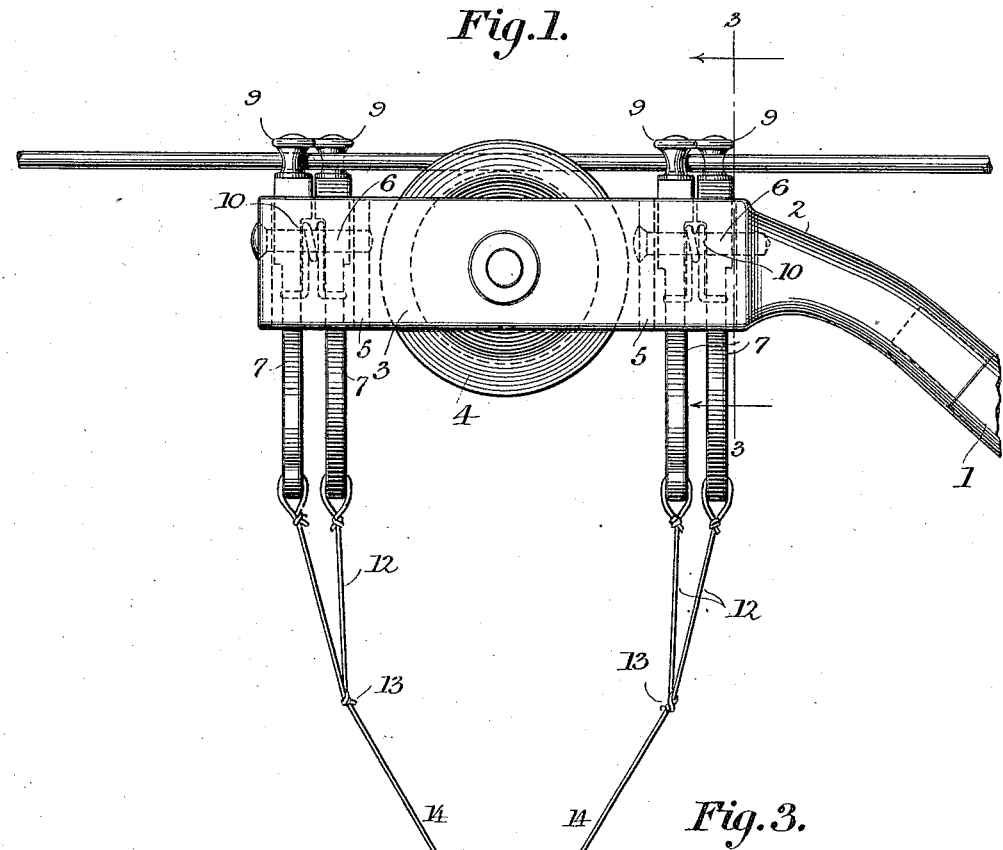
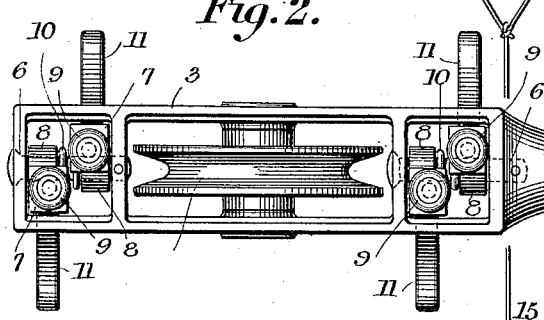
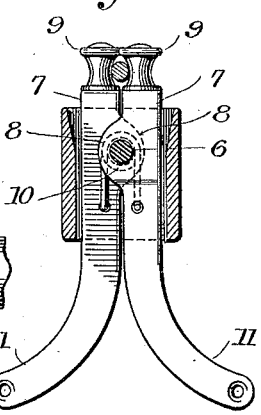
Witnesses
N. F. Barnes
O. Edmonston
Inventors
William R. Daggett
By Victor J. Evans
Attorney

UNITED STATES PATENT OFFICE.

WILLIAM R. DAGGETT, OF SEATTLE, WASHINGTON, ASSIGNOR OF ONE-HALF TO EDWARD B. STEWART, OF SEATTLE, WASHINGTON.

TROLLEY-GUARD.

1,041,437. Specification of Letters Patent. Patented Oct. 15, 1912.

Application filed August 10, 1910. Serial No. 576,443.

*To all whom it may concern:*

Be it known that I, WILLIAM R. DAGGETT, a citizen of the United States, residing at Seattle, in the county of King and State of Washington, have invented new and useful Improvements in Trolley-Guards, of which the following is a specification.

This invention relates to trolley guards and the object of the invention is to provide a simple, efficient and durable guard which will prevent the trolley wheel from jumping and which may be readily operated so that the trolley wheel may be removed from the wire when necessary.

A further object of the invention is to provide a trolley guard which will accommodate itself to the swinging of the trolley wire and which will occupy no more lateral space than does the trolley wheel so that it will pass through a narrow channel.

Further objects of the invention will appear as the following specific description is read in connection with the accompanying drawing which forms a part of this application, and in which:

Figure 1 is a side elevation. Fig. 2 is a top plan view. Fig. 3 is a section on the line 3—3 of Fig. 1.

Referring more particularly to the drawing 1 represents the trolley pole and 2 the harp thereof which comprises an attaching neck for connection with the trolley pole and a rectangular frame 3 in which is pivoted the trolley wheel 4. Positioned at either or both ends of the trolley wheel are cross braces 5 in which are journaled the pivoting shafts 6. These shafts extend longitudinally of the harp and have mounted thereon the guard arms 7 which are spaced apart as shown and are provided with laterally extending ears 8 which are engaged with the shaft 6 and support the arms in vertical position.

Journaled in the upper ends of the arms are the headed buttons or rollers 9 which extend on either side of the trolley wire and have their heads overlapping the same so as to prevent the wheel from jumping off of the wire as will be readily understood by those versed in the art. One pin of each set is slightly advanced with relation to the other and both are held in operative position with relation to the wire by a spiral spring 10 which surrounds the shaft and holds the upper end of the arms together. The lower end of each arm is outwardly curved as shown at 11 in opposition to its coacting arm and both are connected together by cords 12 which are joined together at 13 and have connected thereto an operating cord 14 which acts as a trolley retriever. As long as tension is maintained upon the cord 14 the oppositely extending ends 11 of the arms will be drawn together and the upper ends with their rollers 9 spread apart. As soon as tension is released on the cord 14, the rollers will be moved together by the action of the spring 10 so as to encompass the trolley wire and prevent its disengagement from the wheel 4. Where two sets of arms 7 are used, the cords 14 are joined together and connected to a cord 15.

Having thus described the invention, what is claimed is—

The combination with a trolley harp comprising a rectangular frame having partitions extending across from side to side and a wheel journaled in the frame between said partitions, of longitudinally separated pairs of arms pivoted in the frame and for lateral movement between the ends of the frame and the partitions, a single pivot member for each pair of arms, a single spring for holding the upper ends of each pair together, a headed roller carried by the upper end of each arm of the separated pairs and adapted to coact with the roller on the opposite arm to prevent disengagement of the trolley wire from the wheel, the lower ends of said arms being bent outwardly, of flexible members for connecting the lower ends of each pair of arms, flexible members for connecting the lower ends of each pair of arms, flexible members for connecting the last-named members whereby the pairs of arms may be simultaneously operated, and an operating cord connected to the last members.

In testimony whereof I affix my signature in presence of two witnesses.

WILLIAM R. DAGGETT.

Witnesses:
S. A. KEENAN,
E. B. STEWART.

Copies of this patent may be obtained for five cents each, by addressing the "Commissioner of Patents, Washington, D. C."